United States Patent

Amit et al.

(10) Patent No.: US 8,606,377 B2
(45) Date of Patent: Dec. 10, 2013

(54) PREVENTING DISRUPTIVE COMPUTER EVENTS DURING MEDICAL PROCEDURES

(75) Inventors: Mati Amit, Zur-Yigal (IL); Yitzhack Schwartz, Haifa (IL)

(73) Assignee: Biosense Webster, Inc., Diamond Bar, CA (US)

( * ) Notice: Subject to any disclaimer, the term of this patent is extended or adjusted under 35 U.S.C. 154(b) by 679 days.

(21) Appl. No.: 12/507,981

(22) Filed: Jul. 23, 2009

(65) Prior Publication Data

US 2011/0022191 A1    Jan. 27, 2011

(51) Int. Cl.
*G05B 9/02*    (2006.01)
*G06F 9/46*    (2006.01)

(52) U.S. Cl.
USPC ............. 700/79; 700/21; 700/40; 717/171

(58) Field of Classification Search
USPC ............ 700/21, 40, 75, 79, 90; 717/168, 717/171–173; 719/319, 320
See application file for complete search history.

(56) References Cited

U.S. PATENT DOCUMENTS

| | | | |
|---|---|---|---|
| 6,226,542 B1 | 5/2001 | Reisfeld | |
| 6,301,496 B1 | 10/2001 | Reisfeld | |
| 6,332,089 B1 | 12/2001 | Acker et al. | |
| 6,339,717 B1 * | 1/2002 | Baumgartl et al. | 600/407 |
| 6,618,612 B1 | 9/2003 | Acker et al. | |
| 6,690,963 B2 | 2/2004 | Ben-Haim et al. | |
| 6,814,733 B2 | 11/2004 | Schwartz et al. | |
| 6,851,058 B1 | 2/2005 | Gartside | |
| 6,892,091 B1 | 5/2005 | Ben-Haim et al. | |
| 6,931,553 B1 | 8/2005 | Plante et al. | |
| 6,997,924 B2 | 2/2006 | Schwartz et al. | |
| 7,156,816 B2 | 1/2007 | Schwartz et al. | |
| 7,188,367 B1 | 3/2007 | Edwards et al. | |
| 7,451,454 B2 | 11/2008 | Chen et al. | |
| 2002/0078121 A1 | 6/2002 | Ballantyne | |
| 2002/0091416 A1 | 7/2002 | Wassmund et al. | |
| 2004/0068178 A1 | 4/2004 | Govari | |
| 2004/0147920 A1 | 7/2004 | Keidar | |
| 2004/0255167 A1 * | 12/2004 | Knight | 713/201 |
| 2006/0058658 A1 * | 3/2006 | King et al. | 600/437 |
| 2006/0090169 A1 * | 4/2006 | Daniels et al. | 719/320 |
| 2006/0168660 A1 | 7/2006 | Edwards et al. | |
| 2008/0091284 A1 * | 4/2008 | Sugiyama et al. | 700/90 |
| 2009/0307681 A1 * | 12/2009 | Armado et al. | 717/171 |

FOREIGN PATENT DOCUMENTS

WO    WO 2009/095812 A1    8/2009

* cited by examiner

*Primary Examiner* — Sean P. Shechtman
*Assistant Examiner* — Steven Garland
(74) *Attorney, Agent, or Firm* — Louis J. Capezzuto (57) ABSTRACT

A computer-implemented system for process control has two operating modes: normal mode and active procedure mode, with automatic transition between them. In normal mode, the operating system, firewall and anti-virus are fully operational. When entering a time-critical phase of a process, a process control application signals the operating system and utilities, whereupon transition to active procedure mode automatically occurs, in which access by the system services and by other applications to the resources of the computer is selectively limited in favor of the process control application. Upon completion of the procedure, the system automatically returns to normal mode.

25 Claims, 3 Drawing Sheets

PREVENTING DISRUPTIVE COMPUTER EVENTS DURING MEDICAL PROCEDURES

BACKGROUND OF THE INVENTION

1. Field of the Invention

This invention relates to computer-assisted medical procedures. More particularly, this invention relates to techniques for preventing disruptive computer events during the performance of computer-assisted medical procedures.

2. Description of the Related Art

The meanings of certain acronyms and abbreviations used herein are given in Table 1.

TABLE 1

Acronyms and Abbreviations

| | |
|---|---|
| CD | Compact Disc |
| CPU | Central Processing Unit |
| CT | Computed Tomography |
| MR | Magnetic Resonance |
| USB | Universal Serial Bus |

Most modern general purpose computers and many special purpose computers are controlled by multitasking operating systems. Versions of Unix® and Microsoft Windows® operating systems are widely used examples. The task schedulers of these operating systems may concurrently queue dozens of processes having differing priorities. Some system or kernel processes may generate interrupts asynchronously or perform other actions that preempt various computer resources to the detriment of other processes executing at the application level. Examples of such processes include standard utilities, networking activities, firewall and antivirus functions.

Attempts to alter existing event-driven operating system priorities are known. For example U.S. Pat. No. 6,931,553, issued to Plante et al. discloses selectively enabling general purpose events that would wake a machine from a sleep state, only when the operating system wants particular devices associated with the wake to be able to notify the operating system that a wake event has occurred.

Another approach is taken in U.S. Pat. No. 7,451,454, issued to Chen et al. An event mechanism is implemented in a multiprocessor or hyper-threading computer architecture, allowing one physical or logical processor to engage in normal processing while directing special event operations to another physical or logical processor. In one embodiment, a timer is set and a polling function is called at the end of each of a plurality of time intervals. The polling function is performed by a first processor. If the polling function results in a positive result, the results of the polling function are processed with a second processor.

BRIEF SUMMARY

In one mechanism of action, asynchronous hardware interrupts generated by various computer resources and external devices may preempt execution of a medically important process. Indeed, this behavior, caused by a combination of computer activities, may cause the computer to become functionally unavailable to a medical process controlling an external medical device or medical procedure for unacceptably long time intervals, and without regard to the criticality of the ongoing medical operation, particularly in regard to realtime and near realtime computer operations that assist the performance of medical procedures on living subjects.

Disclosed embodiments of the invention, provide an easily accessible, standardized software switch that will increase the efficiency and reliability of protecting critical application, such as but not limited to active medical applications, controlling transportation system, from disruptive computer events. This switch renders unnecessary ad hoc techniques such as batch files and scripts to configure the computer's operation in order to prevent disturbances to the operation. To simplify the description, all the description will use the example of medical application.

An embodiment of the invention provides a computer-implemented system for process control having two operating modes: normal mode and active procedure mode, with automatic transition between them. In normal mode, the operating system, firewall and anti-virus are fully operational. When entering a time-critical phase of a process, a process control application signals the operating system and utilities, whereupon transition to active procedure mode automatically occurs, in which access by the system services and by other applications to the resources of the computer is selectively limited in favor of the process control application. Upon completion of the procedure, the system automatically returns to normal mode.

An embodiment of the invention provides a system and method of preventing disruptive computer events in a medical computing system, which is carried out by applying a medical instrument to a living subject to perform a medical procedure thereon; controlling the medical instrument using a medical application executing on a computing device by intercommunicating signals between the computing device and the medical instrument. During a time-noncritical phase of the medical procedure, the computing device is operated in a first mode in which system services and applications other than the medical application are allowed access to resources of the computing device under control of the operating system. The method is further carried out by making a determination that the medical procedure has entered a time-critical phase, and thereupon automatically transitioning the computing device from the first mode to a second mode of operation in which the access by the system services and by other applications to the resources of the computing device is selectively limited in favor of the medical application.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known tangible media for use with a data processing system, such as a diskette, hard drive, or CD-ROM. The code may be distributed on such media, or may be distributed to users from the memory or storage of one computer system over a network of some type to storage devices on other computer systems for use by users of such other systems.

System Architecture

Figure 1:
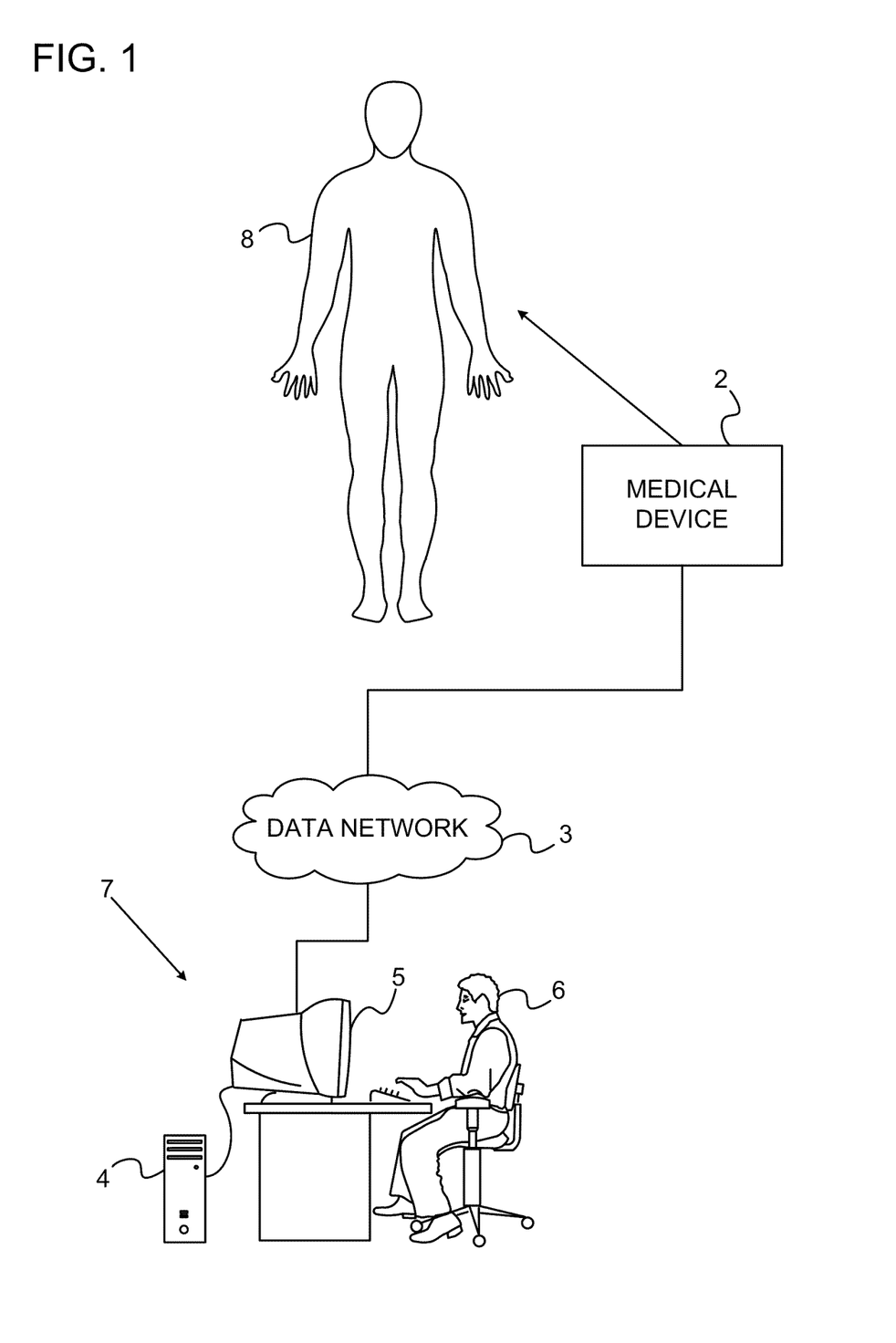
FIG. 1 is a pictorial illustration of a system for performing a time-sensitive medical procedure, which is constructed and operative in accordance with a disclosed embodiment of the invention.

Turning now to the drawings, reference is initially made to FIG. 1, which is a pictorial illustration of a system 7 for performing a time-sensitive medical procedure, which is constructed and operative in accordance with a disclosed embodiment of the invention. A medical device 2 is applied to a living subject 8. The medical device 2 communicates either via either a direct link, or via a data network 3 with a computing device 4, having a display 5. An operator 6 interacts with the medical device 2 via the computing device 4, typically using a graphical interface presented on the display 5 to control the medical device 2. The medical device 2 could be adapted to several medical procedures, such as CT and MR scanning, minimally invasive surgical procedures, remotely controlled robotic surgery, and the like. All of these may require uninterrupted execution of medical software on the computing device 4 to assure a successful outcome.

Figure 2:
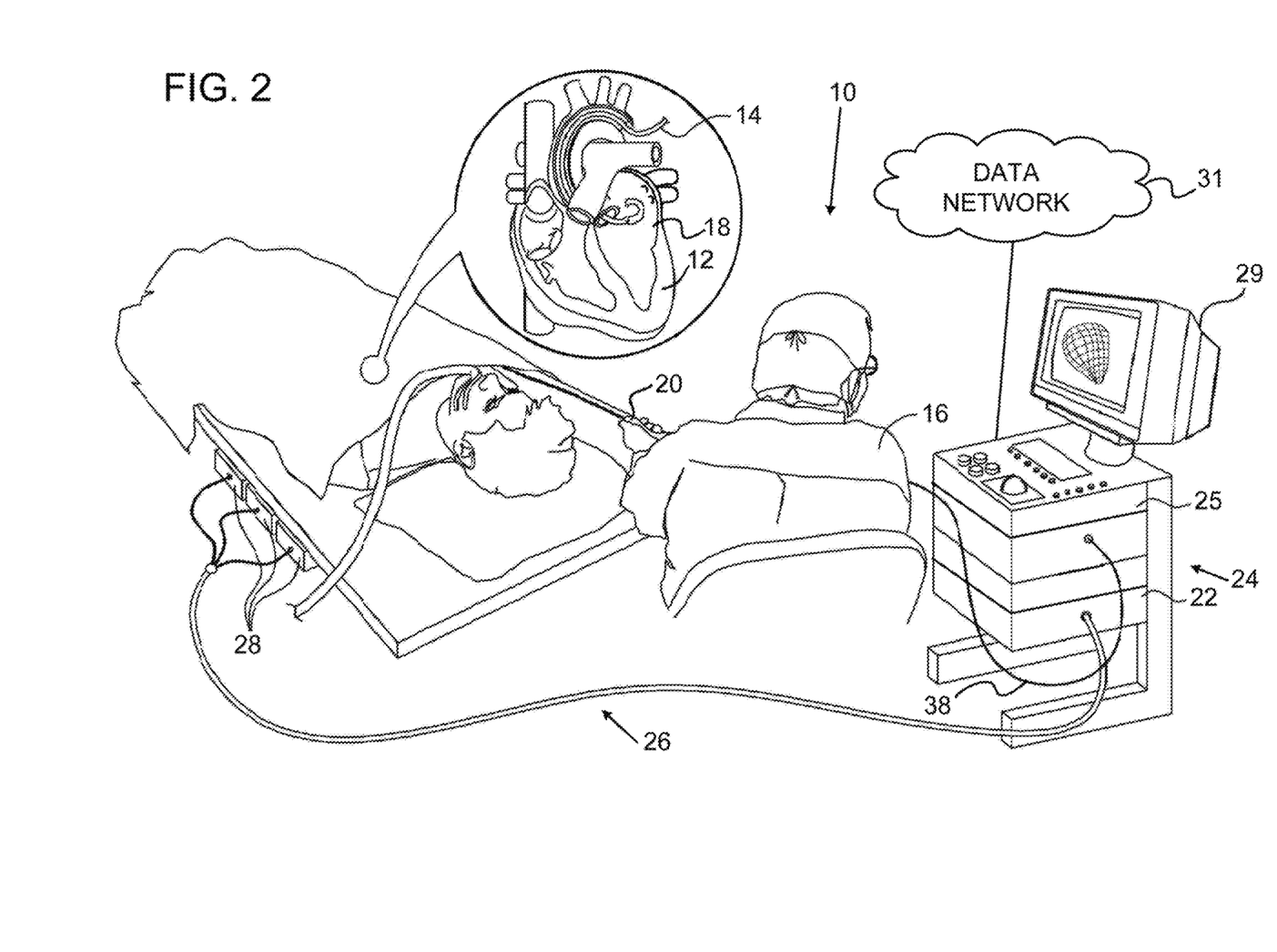
FIG. 2 is a pictorial illustration of a system 10 that is adapted for performing a time-sensitive cardiovascular medical procedure, in accordance with a disclosed embodiment of the invention.

Reference is now made to FIG. 2, which is a pictorial illustration of a more specialized cardiac catheterization system 10 that is adapted for performing time-sensitive cardiovascular medical procedures, and which is operative for carrying out the present invention. The system 10, depicted in FIG. 2 by way of example and not of limitation, is capable of detecting areas of abnormal electrical activity and performing ablative procedures on a heart 12 of a living subject. Alternatively or additionally, the principles of the present invention may similarly be applied in other types of computer-controlled medical diagnostic and therapeutic systems, or to any other control system, including, but not limited to traffic control or power station operations, all of which involve control of some external device by a computer process.

The system 10 comprises a conventional cardiac catheter 14, having one or more sensing or ablation electrodes (not shown). The catheter 14 is percutaneously inserted by an operator 16, who is typically a physician, through the patient's vascular system into a chamber or vascular structure of the heart. The operator 16 brings the catheter's distal tip 18 into contact with the heart wall at a target site that is to be evaluated. Electrical activation maps are then prepared, according to the methods disclosed in the above-noted U.S. Pat. Nos. 6,226,542, and 6,301,496, and in commonly assigned U.S. Pat. No. 6,892,091, whose disclosure is herein incorporated by reference.

Areas determined to be abnormal by evaluation of the electrical activation maps can be ablated by application of thermal energy, e.g., by passage of radiofrequency electrical current through wires in the catheter to one or more electrodes at the distal tip 18, which apply the radiofrequency energy to the myocardium. The energy is absorbed in the tissue, heating it to a point (typically about 50° C.) at which it permanently loses its electrical excitability. When successful, this procedure creates non-conducting lesions in the cardiac tissue, which disrupt the abnormal electrical pathway causing the arrhythmia.

A brief presentation of some details of certain elements of the system 10 will assist in appreciation of the time-criticality of the catheterization procedure shown in FIG. 2. The catheter 14 typically comprises a handle 20, having suitable controls on the handle to enable the operator 16 to steer, position and orient the distal end of the catheter as desired for the ablation. To aid the operator 16, the distal portion of the catheter 14 contains position sensors (not shown) that provide signals to a positioning processor 22, located in a console 24. The console 24 typically contains an ablation power generator 25. The catheter 14 may be adapted to conduct ablative energy to the heart using any known ablation technique, e.g., radiofrequency energy, ultrasound energy, and laser energy. Such methods are disclosed in commonly assigned U.S. Pat. Nos. 6,814,733, 6,997,924, and 7,156,816, which are herein incorporated by reference.

The positioning processor 22 is an element of a positioning system 26 that measures location and orientation coordinates of the catheter 14. Its continuous operation is essential to patient safety while the catheter is within the heart, and to assure a successful completion of the medical procedure. In some applications the positioning processor 22 may be operably connected to a data network 31, which could be a local area network or wide area network, for example the Internet. The network 31 can be a wired or wireless network.

In one embodiment, the positioning system 26 comprises a magnetic position tracking system that determines the position and orientation of the catheter 14. The positioning system 26 generates magnetic fields in a predefined working volume its vicinity and senses these fields at the catheter. The positioning system 26 typically comprises a set of external radiators, such as field generating coils 28, which are located in fixed, known positions external to the patient. The coils 28 generate fields, typically electromagnetic fields, in the vicinity of the heart 12.

In an alternative embodiment, a radiator in the catheter 14, such as a coil, generates electromagnetic fields, which are received by sensors (not shown) outside the patient's body.

Some position tracking systems that may be used for this purpose are described, for example, in the above-noted U.S. Pat. No. 6,690,963, and in commonly assigned U.S. Pat. Nos. 6,618,612 and 6,332,089, and U.S. Patent Application Publications 2004/0147920, and 2004/0068178, whose disclosures are all incorporated herein by reference. Although the positioning system 26 shown in FIG. 2 uses magnetic fields, the methods described below may be implemented using any other suitable positioning system, such as systems based on electromagnetic fields, acoustic or ultrasonic measurements. The positioning system 26 may be realized as the CARTO® XP EP Navigation and Ablation System, available from Biosense Webster, Inc., 3333 Diamond Canyon Road, Diamond Bar, Calif. 91765.

As noted above, the catheter 14 is coupled to the console 24, which enables the operator 16 to observe and regulate the functions of the catheter 14. Console 24 includes a processor, preferably a computer with appropriate signal processing circuits. The processor is coupled to drive a monitor 29. The signal processing circuits typically receive, amplify, filter and digitize signals from the catheter 14, including signals generated by the sensors 33, 35 and a plurality of sensing electrodes 37. The digitized signals are received and used by the console 24 to compute the position and orientation of the catheter 14 and to analyze the electrical signals from the electrodes. The information derived from this analysis is used to generate an electrophysiological map of at least a portion of the heart 12 or structures such as the pulmonary venous ostia, for diagnostic purposes such as locating an arrhythmogenic area in the heart 12 or to facilitate therapeutic ablation.

Typically, the system 10 includes other elements, which are not shown in the figures for the sake of simplicity. For example, the system 10 may include an electrocardiogram (ECG) monitor, coupled to receive signals from one or more body surface electrodes, so as to provide an ECG synchronization signal to the console 24. As mentioned above, the system 10 typically also includes a reference position sensor, either on an externally-applied reference patch attached to the exterior of the subject's body, or on an internally-placed catheter, which is inserted into the heart 12 maintained in a fixed position relative to the heart 12. By comparing the position of the catheter 14 to that of the reference catheter, the coordinates of catheter 14 are accurately determined relative to the heart 12, irrespective of heart motion.

Positioning Processor

Figure 3:
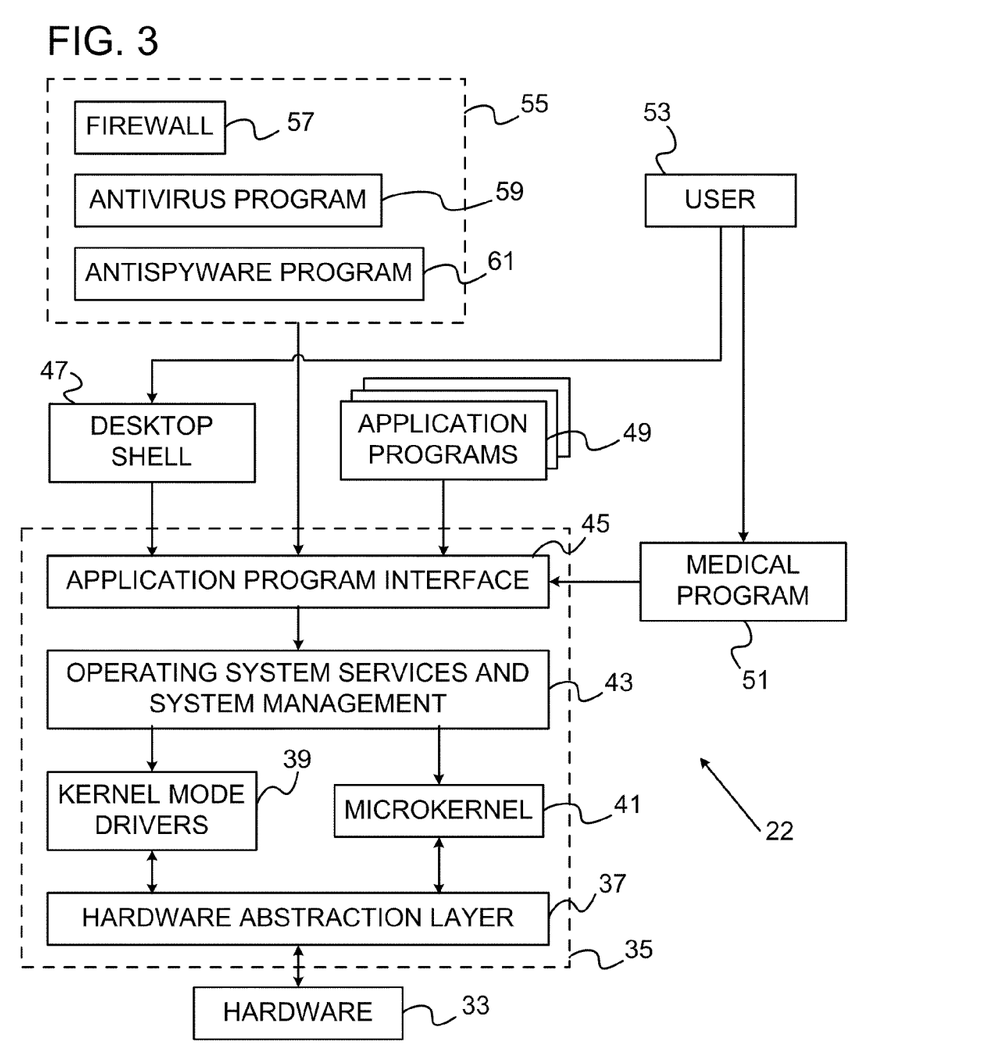
FIG. 3 is a block diagram of a positioning processor in the system shown in FIG. 2, in accordance with a disclosed embodiment of the invention.

Reference is now made to FIG. 3, which is a block diagram of the positioning processor 22 (FIG. 2), which is constructed and operative in accordance with a disclosed embodiment of the invention. The positioning processor 22 is programmed with suitable application and operating system software for carrying out the functions described hereinbelow. Thus, although the positioning processor 22 is shown as comprising a number of separate functional blocks, these blocks are not necessarily separate physical entities, but rather represent different computing tasks or data objects stored in a memory that is accessible to the processor. The positioning processor 22 may comprise a single processor, or multiple processors. The positioning processor 22 comprises conventional computer hardware 33, including a central processing unit (CPU), and memory, which stores data objects and programs hereinafter described. These conventional elements are not shown in the interest of simplicity of presentation.

The hardware 33 is controlled by an operating system 35, which in the current embodiment is Windows XP Embedded. However, any version of the Microsoft Windows operating system may be used up to the Windows® XP operating system. The operating system 35 comprises a hardware abstraction layer 37, which closely interacts with the hardware 33, with kernel mode drivers 39, and with the Windows microkernel 41. The operating system 35 also includes a large number of system services 43, including many system management facilities. An application program interface 45 relates the services 43 to a desktop shell 47, and any number of application programs 49. One application program is medical program 51, which may include foreground and background processes. Its execution as perceived by a human user 53 must be continuous. A group of security applications 55 utilizes the application program interface 45. The group includes a firewall 57, antivirus program 59, and antispyware program 61.

Reference is again made to FIG. 2. Normally, the positioning processor 22 executes many functions in addition to computing the position of the catheter 14 is configured to permit standard software packages to operate and to be updated automatically, via a network, and also to connect automatically to other computers and accessories as necessary. If an update or connection occurs during a medical procedure, however, it may have a disruptive, or even dangerous, effect. In addition to competition in the Windows scheduler among the medical program 51 and application programs 49 (FIG. 3), examples of potentially harmful interfering events include:

Automatic updates of time zones, e.g., transitions between summer and winter times and data transitions;
Automatic updates of dates;
Automatic update of anti-virus software;
Automatic activation of anti-virus or spyware removal software;
Automatic connection of external applications when connecting drives, such as USB or DVD drives;
Automatic system upgrades; and
Automatic operating system background activities relating to antivirus applications, disk cleanup, and software upgrades, i.e., upgrades to the antivirus database.

Such events could slow down the medical program 51, degrade the performance, of the medical program 51 e.g., by slowing the user interface when updating a presentation. Indeed, such events could result in a perceived stoppage of the medical program 51, and could cause essential medical data to be compromised or lost. They constitute safety and efficiency hazards, which could be mitigated simply by isolating the dedicated workstation or computerized system from the network 31. In many applications, however, connectivity with the network 31 is often advantageous and sometimes obligatory.

In embodiments of the invention, the positioning processor 22 has at least two modes of operation: (1) a default normal mode, and (2) a protective mode, referred to as "active medical procedure mode" when a medical procedure is active. Other operating modes include a remote access mode for maintenance, and a remote access mode, used in telemedicine, in which realtime information is supplied to a remote physician. Transition between these modes of operation is generally automatic. However, under some circumstances, however, the transition may be operator-initiated.

In normal mode, the operating system, firewall and anti-virus programs are fully operational. When initiating a medical procedure, the medical program 51 signals the operating system and the application programs 49 that a time-critical phase of the medical procedure has begun, causing the system to undergo a state transition from normal mode to active medical procedure mode. The transition occurs rapidly. For example, the transition typically takes less than one second using current versions of CT and X-ray systems. Such transitions are typically required whenever a scan begins and ends. An indication, for example an icon indicating "dedicated protected medical procedure" may also appear on the computer desktop to alert medical personnel that the system 10 is operating in active medical procedure mode. Once the medical program 51 recognizes that the medical procedure has ended, it initiates another state transition from active medical procedure mode to normal mode.

During typical normal operation the firewall and anti-virus programs are operational, and full connectivity to the network is allowed. Furthermore, the processor may execute system code having high priority or having critical sections, including reading CD and USB memory. In active medical procedure mode, no new network connections can be established. Newly connected USB memory is inaccessible, and only the most essential computer resources may be allocated to functions other than the medical program 51 itself.

Companies manufacturing operating systems and utilities, such as anti-virus and firewall tools for use in the system 10 may be required to recognize state transitions between the modes of operation and to support active medical procedure mode. In this latter mode, the potentially harmful events listed above are blocked. The operating system optimizes (and typically minimizes) background activities in order to maximally allocate resources to the medical program 51. The medical program 51 continuously notifies the operating system of its status throughout the medical procedure, for example by a system call or a message. Upon completion of the medical procedure, the system switches from active medical procedure mode back to normal mode.

Figure 4:
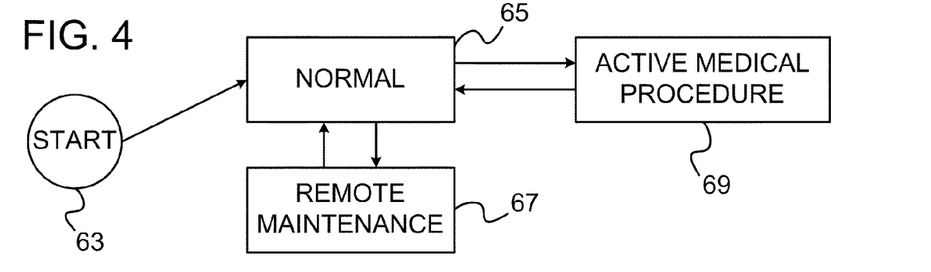
FIG. 4 is a state diagram illustrating operating modes of the system shown in FIG. 2, in accordance with a disclosed embodiment of the invention.

Reference is now made to FIG. 4, which is a state diagram illustrating the operating modes of the system shown in FIG. 2, in accordance with a disclosed embodiment of the invention. Operation is initiated at state 63, at which time an immediate state transition to one of the system mode states, typically, state 65, in which the system is operating in normal mode. A transition may occur from state 65 to state 67, during which the system is controlled remotely for purposes of system maintenance. When released, a transition occurs in which the system reverts to state 65. When a medical procedure is in progress, a transition to state 69 occurs, in which the system operates in active medical procedure mode. This transition may be operator-initiated, or can occur programmatically, e.g., induced by operation of the medical program 51 (FIG. 3). Additionally or alternatively the transition from state 65 to state 69 may be induced by a control signal from a medical device, such as the catheter 14 (FIG. 2), for example, when the catheter 14 is first connected into the system. When a time-critical phase of the medical procedure is complete, a reversion to state 65 occurs, either at the instance of the operator, or automatically.

Implementation

Table 2 summarizes the functionality of the positioning processor 22 (FIG. 3) in each of the modes of operation:

TABLE 2

| Functionality | Active Medical Procedure Mode Functionality |
|---|---|
| Object Store: | |
| File System | Divide the disk to system, application and data objects. Lock the system and the application areas from update. Avoid locking the data areas. |
| Registry | Divide the registry to system, application and data areas. Lock from update the system and the application areas. Avoid locking the data areas. |
| Device drivers | Disable installing and updating of any device driver. |
| Services | Lock some of the system services. e.g., indexing service, defragmentation service, garbage collection services. Operate some of the services in special modes and limit the allocated resources such as memory and CPU time |
| File system commit mode | Support file system commit mode as implemented in Windows XP Embedded. |
| Network stack: | |
| File sharing | Lock all file sharing except the files requested by application. |
| Socket management | Enable only predefine list of applications to open a socket. |
| Security Elements: | |
| Firewall | Minimize the application operation. |
| Antivirus | Verify that these application |
| Antispyware | maximal CPU resources will be defined to known percentage. |

TABLE 2-continued

| Functionality | Active Medical Procedure Mode Functionality |
|---|---|
| System Configuration: | |
| User management Control panel applet System time | Prevent updates |
| User interface: | |
| Popup dialogs & notifications Capture user input Play sound | Prevent user interaction, except the predefine application list. |
| Alt Control Del Sleep mode soft power off Power off | Enable configuration if this command access to the user or capture by application. Send interrupt to the application that enable turning off HW device control. |

Essentially, when operating in active medical procedure mode, the medical program 51 has an enhanced ability to control system resource allocation. Variants of active medical procedure mode are possible, among which the degree of control of system resources differs, For example, there are differences among "CT Active Mode", "MRI Active Mode", "Remote Control Mode" and "Remote Maintenance Mode", where in some cases certain legal requirements must be satisfied.

Object Store

File System

To implement the file system aspect, divide the disk into system, application and data areas. The system and the application areas are locked in order to prevent updates. The file system driver is modified so as to include an additional attribute that specifies whether a file or directory is locked. Normally the lock is disabled in normal mode and enabled in active medical procedure mode. For example, when the lock is enabled for a directory, the permissions for all files in the directory and its subdirectories are read/execute only.

Registry

The registry is divided into system, application and data areas or keys. The system and the application areas of the registry are locked in order to prevent updates.

The file registry subsystem driver is modified so as to recognize an additional attribute that specifies whether a registry key is locked. Normally the lock is disabled in normal mode and enabled in active medical procedure mode. Each registry sub-tree should include a key having this attribute. In active medical procedure mode locked registry sub-trees are read-only as to all keys, values and data.

Device Drivers

It is possible to specify whether the system configuration is locked, and cannot be changed; and if the auto plug-and-play functionality is enabled. In active medical procedure mode, the system configuration is typically locked, and plug and play functionality disabled. In normal mode, both are usually enabled. For example, in active medical procedure mode it is no longer possible to enable, disable, or reconfigure device drivers, e.g., display adapters, USB devices, network adapters, imaging devices, pointing devices, modems, monitors, and various motherboard resources such as memory access controllers. In normal mode such operations may be permitted according to governing security policies, for example by changing access permissions according to the system state.

System Services

In normal mode a number of services are typically enabled in the Windows operating system. It is desirable in active medical procedure mode to selectively disable these. This is accomplished by assigning a service attribute to each system service that specifies its status as locked or unlocked in each mode of operation. For example, indexing and defragmentation services are specified as unlocked in normal mode and locked in active medical procedure mode. Locked services are disabled until the system returns to normal mode, whereupon they are unlocked, and return to their previous status. Thus, if a particular service were disabled in normal mode, it remains disabled in active medical procedure mode and continues to be disabled when normal mode is restored.

It is also possible to assign the service attribute to permit services to operate, but with limited resource allocation. This is desirable, for example, with garbage collection service. Such services can be controlled using a special parameter, which takes on an appropriate effective value, according to whether the operation mode is normal mode or active medical procedure mode. The following are examples of such parameters: "Priority"; "Cache mode enabled"; "Wireless transmitting power". The limiting resource allocation applies to such services as CPU, disk access, memory, network, etc. The special parameters specify the maximum resource allocation for each mode of operation.

File System Commit Mode

File system commit mode is implemented in Windows XP Embedded and may be exploited in some embodiments of the present invention. Support of this mode is desirable to enable protection of the application software (e.g., from viruses) and protection of critical application data including configuration. When part of the storage is on flash-disk, use of file system commit mode reduces physical write operations and increases the flash-disk reliability.

Network Stack
File Sharing

In normal mode, a user can generally specify the sharing property of files and directories. In active medical procedure mode it is possible to prevent the user from changing sharing properties, except for sharing required by the medical program 51, which is privileged to override sharing locks. This may be implemented by duplicating sharing definitions in the different modes of operation. Upon returning to normal mode, the ability is automatically restored.

Sockets

Typically a firewall offers one configuration. In embodiments of the invention a user is enabled to specify different configurations, which automatically come into force when the operation mode undergoes transitions between normal mode and active medical procedure mode. Typically in active medical procedure mode the firewall is reconfigured such that only a predefined group of applications are privileged to establish new network connections by opening a socket.

Security Elements
Limitation of Application Activities

Referring again to FIG. 3, each of the security applications 55 has a configuration that differs in normal mode from that in active medical procedure mode. The following are examples:

Firewall: A mode-specific configuration is loaded for the firewall 57 upon a transition event between normal mode and active medical procedure mode, and the configuration existing immediately prior to the transition is saved. Once loaded, the mode-specific configuration cannot be changed until the next transition occurs. This arrangement enables all definitions to be cached for efficient access, e.g., saving data using an efficient hashing table.

Antivirus Program: In active medical procedure mode, the antivirus program 59 is disabled from scheduled activations, e.g., updates from a server, scheduled scans. For newly connected device, e.g., a newly connected USB flash memory, the antivirus program is modified with a suitable call back function that enables the medical program 51 to control the activities of the antivirus program. In order for the antivirus program to operate in this manner, suitable hooks are required to be provided by its developer.

If a scheduled scan is attempted by the antivirus program 59, the control response issued by the medical program 51 may be one of the following: deny connectivity, accept the scan request, and accept incomplete scan, according to the current mode of operation.

In embodiments in which the antivirus program 59 is not entirely disabled, it is additionally configured such that in active medical procedure mode scan errors are returned directly to the medical program 51, which determines the required action. For example, in active medical procedure mode a pop-up window, routinely generated in normal mode, might be distracting to the operator and therefore may be unacceptable.

An aspect of the configuration of the antivirus program is a limitation to scan different sets of predefined files in different operating nodes. A list of such files is activated at each mode transition.

In active medical procedure mode, the antispyware program 61 is optionally disabled automatically.

In active medical procedure mode, Resource-specific quotas of computer hardware resources are assigned to the security applications 55, to be shared among the firewall 57 antivirus program 59. They are also shared with the antispyware program 61 in embodiments in which the antispyware program 61 remains enabled. Examples include collective quotas for CPU utilization, disk access, and physical memory. These limits are tailored to the configuration of the positioning processor 22 (FIG. 3) and the medical program 51 in order to assure that adequate resources are available for the medical program 51. When the quotas would be exceeded, activities by the security applications 55 are automatically limited. For instance, network access requests via the firewall 57 and scans to be performed by the antivirus program 59 are delayed until resources become available, or there is a transition to normal mode.

System Configuration

In active medical procedure mode updates to the system configuration are disallowed. The following system configuration elements are locked when a transition to active medical procedure mode occurs:

User management. There is no ability to add, change, and delete users or to change user configurations, even for members of the administrative group.

Control panel applet. Parameters relating to the Windows control panel cannot be changed.

System time—In active medical procedure mode the system time and date cannot be altered. Time changes, e.g., switching between summer and winter times, or correction of the system clock, e.g., by coordination with a time server, are delayed until returning to normal mode. This can be accomplished by raising an error when time functions are called.

User Interface

The following interactions between the user and applications are modified in active medical procedure mode and restored to their default values in normal mode:

Except with a predefined set of applications, user interaction with application programs 49 (FIG. 3) is prevented in active medical procedure mode.

Configuration of all the application programs 49 except the predefined set is blocked during active medical procedure mode.

All the application programs 49 except the predefined set are blocked from exercising control of the hardware 33 (FIG. 3), including any peripherals. For example, applications are blocked from changing the display resolution, and enabling or disabling hardware ports. This may be accomplished by sending an interrupt to selected ones of the application programs 49 that, when handled, blocks disables any control or access to the hardware 33 that could be exercised by the application programs. Implementing this feature may require modification of the application code in some cases. Other applications may be simply starved of computer resources, which is faster and less expensive of resources than closing them completely.

Even with respect to the predefined set of application programs 49, user activities are limited in active medical procedure mode. In Microsoft Windows, the ability to interact with a popup or with an icon in the notification area depends on a callback function. The callback function is given a mode-specific configuration. In active medical procedure mode, distracting pop-up displays in the notification area are blocked. When interaction is required, the callback should be able to automatically supply a response. In normal mode, the callback function assumes its default configuration.

Capture user input—The system 10 can be configured dynamically, such that a specific application captures all user inputs automatically.

All applications that generate audible indicators are given mode-specific configurations that modify or mute the sounds during active medical procedure mode. For example, applications running in the background are typically prevented from emitting sounds during active medical procedure mode.

In active medical procedure mode the keyboard interrupts generated by the "alt-control-del" key combination, the keys invoking "sleep mode", and "soft power off", and "log-off" are modified, so that they are received only by a specific application, such as the medical program 51.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

We claim:

1. A method of preventing disruptive computer events in a computing system, comprising:
   executing a process for controlling an external device, the process having a time-noncritical phase and a time-critical phase;
   controlling the process using a process control application executing on a computing device managed by an operating system by intercommunicating signals between the computing device and the external device;
   during the time-noncritical phase, operating the computing device in a first mode in which system services and applications other than the process control application are allowed access to resources of the computing device under control of the operating system;
   operating the computing device in a second mode upon making a determination that the process has entered the time-critical phase; and
   responsively to the determination, automatically transitioning the computing device from the first mode to the second mode in which the access by the system services and by other applications to the resources of the computing device is selectively limited in favor of the process control application in the second mode; wherein the computing device further comprises a file system having storage objects residing therein, and wherein automatically transitioning the computing device comprises selectively disallowing updates of the storage objects in the file system, and wherein the storage objects comprise a registry having system keys for use by the operating system, application keys for use by the other applications, and data keys, and wherein selectively disallowing updates of the storage objects comprises locking the system keys and the application keys of the registry to prevent updates therein while avoiding locking the data keys of the registry.

2. The method according to claim 1, wherein the operating system has a plurality of system functions that have respective behaviors in the plurality of operating modes.

3. The method according to claim 2, wherein the plurality of operating modes further comprises a third mode for remotely controlling the computing device, and a fourth mode for performing remote maintenance on the computing device.

4. The method according to claim 1, wherein the computing device is linked to a data network via sockets, the method further comprising allowing only a predefined network-privileged set of the other applications to establish a new connection via the data network.

5. The method according to claim 4, wherein allowing only a predefined network-privileged set of the other applications to establish a new connection comprises preventing an opening of the sockets.

6. The method according to claim 1, wherein a security application group comprises at least one of a firewall, an antivirus program, and an antispyware program, the firewall having a current configuration further comprising limiting collective usage of hardware resources of the computing device by the security application group to a predefined security group maximum.

7. The method according to claim 6, wherein automatically transitioning the computing device further comprises disabling scheduled scans and updates of the antivirus program.

8. The method according to claim 6, wherein automatically transitioning the computing device further comprises blocking updates of a configuration of the computing device and disabling the antispyware program.

9. The method according to claim 8, wherein user directives are entered via a user management interface, a control panel applet, and a time management interface, and wherein blocking updates of the configuration of the computing device comprises:
   storing a current configuration of the firewall and thereafter preventing modifications thereof;
   disabling scheduled activations of the antivirus program;
   preventing access to the user management interface;
   preventing access to the time management interface; and
   preventing access to the control panel applet.

10. The method according to claim 9, wherein the configuration of the computing device is responsive to a task management interface, and to keyboard-generated interrupts, wherein blocking updates of the configuration of the computing device further comprises preventing ones of the keyboard-generated interrupts that invoke the task management interface, induce a sleep mode of operation of the computing device, and disconnect power to the computing device from being received by all the other applications except a second predefined set of the other applications.

11. A method of preventing disruptive computer events in a medical computing system, comprising:
applying a medical instrument to a living subject to perform a medical procedure thereon, the medical procedure having a time-noncritical phase and a time-critical phase;
controlling the medical instrument using a medical application executing on a computing device managed by an operating system by intercommunicating signals between the computing device and the medical instrument;
during the time-noncritical phase, operating the computing device in a first mode in which system services and applications other than the medical application are allowed access to resources of the computing device under control of the operating system;
making a determination that the medical procedure has entered the time-critical phase; and
responsively to the determination, automatically transitioning the computing device from the first mode to a second mode in which the access by the system services and by other applications to the resources of the computing device is selectively limited in favor of the medical application in the second mode; wherein the computing device further comprises a file system having storage objects residing therein, and wherein automatically transitioning the computing device comprises selectively disallowing updates of the storage objects in the file system, and wherein the storage objects comprise a registry having system keys for use by the operating system, application keys for use by the other applications, and data keys, and wherein selectively disallowing updates of the storage objects comprises locking the system keys and the application keys of the registry to prevent updates therein while avoiding locking the data keys of the registry.

12. A medical system of preventing disruptive computer events in a medical computing system, comprising:
a medical instrument applicable to a living subject to perform a medical procedure thereon, the medical procedure having a time-noncritical phase and a time-critical phase; and
a computing device managed by an operating system for controlling the medical instrument using a medical application executing on the computing device by intercommunicating signals between the computing device and the medical instrument, the computing device operative during the time-noncritical phase, in a first mode in which system services and applications other than the medical application are allowed access to resources of the computing device under control of the operating system, the computing device cooperative with the medical instrument for making a determination that the medical procedure has entered the time-critical phase, and responsively to the determination, the computing device adapted for automatically transitioning from the first mode to a second mode in which the access by the system services and by other applications to the resources of the computing device is selectively limited in favor of the medical application in the second mode; wherein the computing device further comprises a file system having storage objects residing therein, and wherein automatically transitioning comprises selectively disallowing updates of the storage objects in the file system; and wherein the storage objects comprise a registry having system keys for use by the operating system, application keys for use by the other applications, and data keys, and wherein selectively disallowing updates of the storage objects comprises locking the system keys and the application keys of the registry to prevent updates therein while avoiding locking the data keys of the registry.

13. The medical system according to claim 12, wherein making a determination comprises sending an indication from the medical application to the operating system.

14. The medical system according to claim 12, wherein portions of the storage objects in the file system are classified as system objects for access thereof by the operating system, application objects for access thereof by the other applications, and data objects, the storage objects further comprising device drivers, and wherein at least a portion of the storage objects have sharing attributes that determine sharability with other computing devices, wherein selectively disallowing updates of the storage objects comprises:
locking the system objects and application objects of the file system to prevent updates thereof while avoiding locking the data objects of the file system;
preventing updating of the device drivers; and
preventing modification of the sharing attributes of the storage objects.

15. The medical system according to claim 12, wherein the computing device is linked to a data network via sockets, and further comprising allowing only a predefined network-privileged set of the other applications to establish a new connection via the data network.

16. The medical system according to claim 15, wherein allowing only a predefined network-privileged set of the other applications to establish a new connection comprises preventing an opening of the sockets.

17. The medical system according to claim 12, wherein a security application group comprises at least one of a firewall, an antivirus program, and an antispyware program, the firewall having a current configuration further comprising limiting collective usage of hardware resources of the computing device by the security application group to a predefined security group maximum.

18. The medical system according to claim 17, wherein automatically transitioning further comprises disabling scheduled scans and updates of the antivirus program.

19. The medical system according to claim 17, wherein automatically transitioning further comprises blocking updates of a configuration of the computing device and disabling the antispyware program.

20. The medical system according to claim 19, wherein user directives are entered via a user management interface, a control panel applet, and a time management interface, and wherein blocking updates of the configuration of the computing device comprises:
storing a current configuration of the firewall and thereafter preventing modifications thereof;
disabling scheduled activations of the antivirus program;
preventing access to the user management interface;
preventing access to the time management interface; and
preventing access to the control panel applet.

21. The medical system according to claim 20, wherein the configuration of the computing device is responsive to a task management interface, and to keyboard-generated interrupts, wherein blocking updates of the configuration of the computing device further comprises preventing ones of the keyboard-generated interrupts that invoke the task management interface, induce a sleep mode of operation of the computing device, and disconnect power to the computing device from being received by all the other applications except a second predefined set of the other applications.

22. A method of preventing disruptive computer events in a computing system, comprising:
executing a process for controlling an external device, the process having a time-noncritical phase and a time-critical phase;
controlling the process using a process control application executing on a computing device managed by an operating system by intercommunicating signals between the computing device and the external device;
during the time-noncritical phase, operating the computing device in a first mode in which system services and applications other than the process control application are allowed access to resources of the computing device under control of the operating system;
operating the computing device in a second mode upon making a determination that the process has entered the time-critical phase; and
responsively to the determination, automatically transitioning the computing device from the first mode to the second mode in which the access by the system services and by other applications to the resources of the computing device is selectively limited in favor of the process control application in the second mode; wherein the computing device further comprises a file system having storage objects residing therein, and wherein automatically transitioning the computing device comprises selectively disallowing updates of the storage objects in the file system, and wherein portions of the storage objects in the file system are classified as system objects for access thereof by the operating system, application objects for access thereof by the other applications, and data objects, the storage objects further comprising device drivers, and wherein at least a portion of the storage objects have sharing attributes that determine sharability with other computing devices, wherein selectively disallowing updates of the storage objects comprises locking the system objects and application objects of the file system to prevent updates thereof while avoiding locking the data objects of the file system; preventing updating of the device drivers; and preventing modification of the sharing attributes of the storage objects.

23. A method of preventing disruptive computer events in a computing system, comprising:
executing a process for controlling an external device, the process having a time-noncritical phase and a time-critical phase;
controlling the process using a process control application executing on a computing device managed by an operating system by intercommunicating signals between the computing device and the external device;
during the time-noncritical phase, operating the computing device in a first mode in which system services and applications other than the process control application are allowed access to resources of the computing device under control of the operating system;
operating the computing device in a second mode upon making a determination that the process has entered the time-critical phase; and
responsively to the determination, automatically transitioning the computing device from the first mode to the second mode in which the access by the system services and by other applications to the resources of the computing device is selectively limited in favor of the process control application in the second mode; wherein a security application group comprises a firewall, an antivirus program, and an antispyware program, the firewall having a current configuration further comprising limiting collective usage of hardware resources of the computing device by the security application group to a predefined security group maximum; wherein automatically transitioning the computing device further comprises blocking updates of a configuration of the computing device and disabling the antispyware program; and wherein user directives are entered via a user management interface, a control panel applet, and a time management interface, and wherein blocking updates of the configuration of the computing device comprises storing the current configuration of the firewall and thereafter preventing modifications thereof; disabling scheduled activations of the antivirus program; preventing access to the user management interface; preventing access to the time management interface; and preventing access to the control panel applet.

24. A medical system of preventing disruptive computer events in a medical computing system, comprising:
a medical instrument applicable to a living subject to perform a medical procedure thereon, the medical procedure having a time-noncritical phase and a time-critical phase; and
a computing device managed by an operating system for controlling the medical instrument using a medical application executing on the computing device by intercommunicating signals between the computing device and the medical instrument, the computing device operative during the time-noncritical phase, in a first mode in which system services and applications other than the medical application are allowed access to resources of the computing device under control of the operating system, the computing device cooperative with the medical instrument for making a determination that the medical procedure has entered the time-critical phase, and responsively to the determination, the computing device adapted for automatically transitioning from the first mode to a second mode in which the access by the system services and by other applications to the resources of the computing device is selectively limited in favor of the medical application in the second mode; wherein the computing device further comprises a file system having storage objects residing therein, and wherein automatically transitioning comprises selectively disallowing updates of the storage objects in the file system; and wherein portions of the storage objects in the file system are classified as system objects for access thereof by the operating system, application objects for access thereof by the other applications, and data objects, the storage objects further comprising device drivers, and wherein at least a portion of the storage objects have sharing attributes that determine sharability with other computing devices, wherein selectively disallowing updates of the storage objects comprises locking the system objects and application objects of the file system to prevent updates thereof while avoiding locking the data objects of the file system; preventing updating of the device drivers; and preventing modification of the sharing attributes of the storage objects.

25. A medical system of preventing disruptive computer events in a medical computing system, comprising:

a medical instrument applicable to a living subject to perform a medical procedure thereon, the medical procedure having a time-noncritical phase and a time-critical phase; and a computing device managed by an operating system for controlling the medical instrument using a medical application executing on the computing device by intercommunicating signals between the computing device and the medical instrument, the computing device operative during the time-noncritical phase, in a first mode in which system services and applications other than the medical application are allowed access to resources of the computing device under control of the operating system, the computing device cooperative with the medical instrument for making a determination that the medical procedure has entered the time-critical phase, and responsively to the determination, the computing device adapted for automatically transitioning from the first mode to a second mode in which the access by the system services and by other applications to the resources of the computing device is selectively limited in favor of the medical application in the second mode; wherein a security application group comprises a firewall, an antivirus program, and an antispyware program, the firewall having a current configuration further comprising limiting collective usage of hardware resources of the computing device by the security application group to a predefined security group maximum; wherein automatically transitioning further comprises blocking updates of a configuration of the computing device and disabling the antispyware program; and wherein user directives are entered via a user management interface, a control panel applet, and a time management interface, and wherein blocking updates of the configuration of the computing device comprises storing the current configuration of the firewall and thereafter preventing modifications thereof; disabling scheduled activations of the antivirus program; preventing access to the user management interface; preventing access to the time management interface; and preventing access to the control panel applet.

* * * * *